United States Patent [19]

Tani et al.

[11] Patent Number: 5,341,722
[45] Date of Patent: Aug. 30, 1994

[54] POSITIONING APPARATUS USED FOR MACHINE TOOLS ETC.

[75] Inventors: Nobuyuki Tani; Tenzo Yamaguchi, both of Settsu, Japan

[73] Assignee: Daikin Industries, Ltd., Osaka, Japan

[21] Appl. No.: 928,369

[22] Filed: Aug. 12, 1992

[30] Foreign Application Priority Data

Aug. 12, 1991 [JP] Japan .................................. 3-201751
Jun. 29, 1992 [JP] Japan .................................. 4-170531

[51] Int. Cl.$^5$ ........................ F15B 15/26; F16D 31/02
[52] U.S. Cl. .......................................... 91/43; 60/435; 92/15
[58] Field of Search ............... 60/413, 414, 435, 436, 60/437, 438, 439, 440, 441, 493; 91/43, 45; 92/15

[56] References Cited

U.S. PATENT DOCUMENTS

| 4,194,365 | 3/1980 | Stoufflet et al. | 60/493 X |
| 4,215,545 | 8/1980 | Morello et al. | 60/437 X |
| 4,507,993 | 4/1985 | Silverman et al. | 82/364 |
| 4,531,431 | 7/1985 | Dreher et al. | 60/438 X |
| 4,653,924 | 3/1987 | Itonaga et al. | 356/369 |
| 4,807,338 | 2/1989 | Myles | 29/38 C |

FOREIGN PATENT DOCUMENTS

| 450071 | 10/1991 | European Pat. Off. . | |
| 7110860 | 7/1982 | Japan | 60/436 |
| 62-277245 | 12/1987 | Japan . | |
| 1105066 | 4/1989 | Japan | 60/437 |
| 1418512 | 8/1988 | U.S.S.R. | 60/436 |
| 9006833 | 12/1988 | World Int. Prop. O. . | |

OTHER PUBLICATIONS

Patent Abstracts of Japan, vol. 12, No. 470 (P798) Dec., 1988 & JP-A-63 191 020 (Tamagawa Seiki) Aug. 8, 1988, abstract only.

Primary Examiner—Edward K. Look
Assistant Examiner—Hoang Nguyen

[57] ABSTRACT

A positioning apparatus can perform high-accuracy positioning in a short time without a Curvic (trademark) or positioning coupling. With provision of a hydraulic motor having a rotary shaft fixed to a turret head and a hollow type rotary encoder for detecting the angle of rotation of the rotary shaft, rotation of the hydraulic motor is controlled by a controller via a control valve. Locking of the rotary shaft is performed by a rebound force of a spring provided in a hydraulic cylinder by pressing a pad provided at a tip portion of a rod against a disk. Unlocking of the rotary shaft is performed by supplying a hydraulic fluid into a cylinder chamber by switching a directional control valve.

8 Claims, 9 Drawing Sheets

POSITIONING APPARATUS USED FOR MACHINE TOOLS ETC.

BACKGROUND OF THE INVENTION

1. Field of the Invention

The present invention relates to a positioning apparatus.

2. Description of the Prior Art

Figure 11:
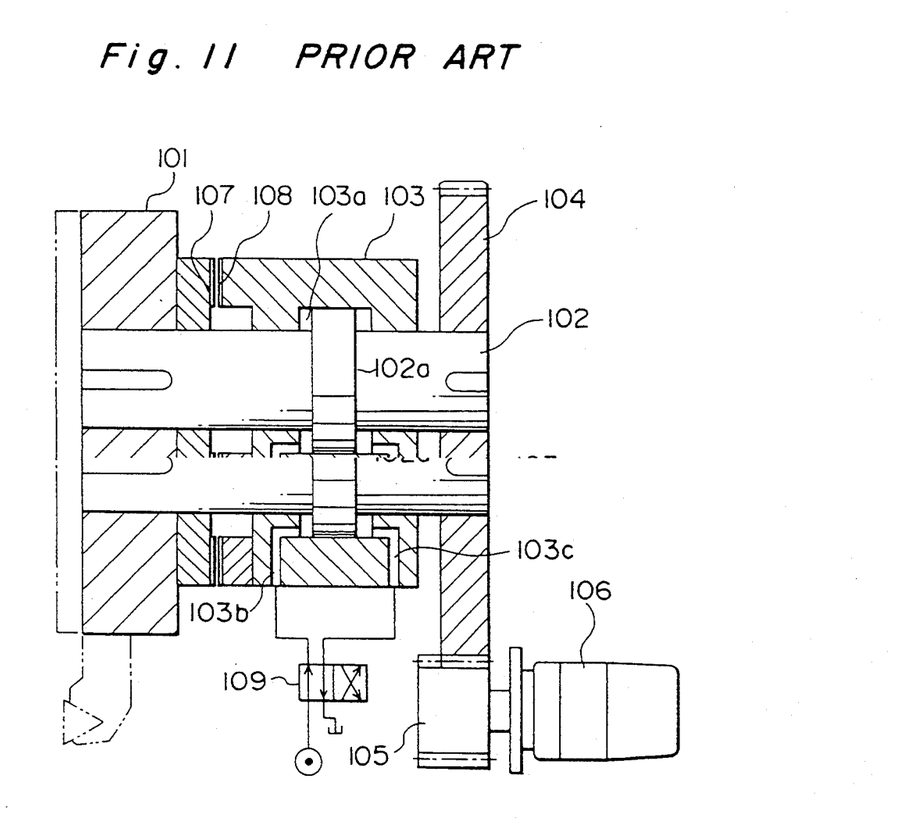
FIG. 11 is a lateral sectional view of a conventional positioning apparatus viewed from above.

Conventionally, there has been a positioning apparatus for a machine tool as shown in FIG. 11 (see Japanese Patent Laid-Open Publication No. 62-277245). The positioning apparatus is to position a turret head of a numerically controlled lathe where a shaft 102 of a turret head 101 is supported rotatably and axially movably at a support block 103, and a reduction gear 104 fixed to the rotary shaft 102 is connected via a gear 105 to a hydraulic motor 106 to rotate the turret head 101 by means of the hydraulic motor 106 and roughly position the turret head 101. There are further provided a positioning coupling (Curvic (trademark) coupling) 107 and 108 on mating faces of the turret head 101 and the support block 103, while the rotary shaft 102 is provided with a piston section 102a protruding radially from the rotary shaft 102. On the support block 103 are provided an oil chamber 103a for receiving the piston section 102a and oil passages 103b and 103c for supplying oil from external to the oil chamber 103a to switch the oil supply direction to the oil chamber 103a by means of a directional control valve 109. Then, oil is supplied through the oil path 103b to move the turret head 101 rightward in FIG. 11 to thereby engage the teeth of the positioning coupling 107 and 108 with each other for the final positioning of the turret head 101, and the coupling is disengaged by supplying oil from the oil path 103c to the oil chamber 103a by switching the directional control vale 109.

However, since the above-mentioned conventional positioning apparatus employs a positioning coupling 107 and 108, it is necessary to axially move the turret head 101 each time positioning or rotating the turret head 101, which disadvantageously results in consuming much time in positioning as well as complication in construction. When the turret head moving speed is increased to reduce the time for movement, a severe impact takes place in coupling the positioning coupling 107, 108, which also incurs the problems of loud noise generation and reduction in lifetime of the apparatus. In the positioning coupling 107 and 108 which achieves coupling by mating the teeth thereof, production of backlash is not avoidable to be incapable of achieving high-accuracy positioning, which also results in limiting the position to be indexed.

SUMMARY OF THE INVENTION

Therefore, the object of the present invention is to provide a positioning apparatus which has a compact structure without using a Curvic (trademark) or positioning coupling and can position a turret head with high accuracy within a short time, and is excellent in safety.

In order to achieve the aforementioned object, the present invention provides a positioning apparatus comprising: a hydraulic motor for driving a rotary shaft of a positioned object, a flow control valve connected to the hydraulic motor, rotation angle detection means for detecting an angle of rotation of the rotary shaft, rotation angle control means for controlling the flow control valve so as to rotate the hydraulic motor by an angle determined based on a detection result of the rotation angle detection means and a rotation angle instruction, and hydraulic locking means for locking the rotary shaft.

The rotation angle detection means may be a hollow type rotary encoder disposed around the rotary shaft.

Further, the rotation angle detection means may comprise a rotation speed accelerating means connected to the rotary shaft, an accelerated rotary shaft whose rotation speed is accelerated by the rotation speed accelerating means and a rotary encoder for detecting an angle of rotation of the accelerated rotary shaft.

Furthermore, an accumulator may be connected to an oil supply line toward the flow control valve.

Further, the hydraulic motor may be disposed with its output shaft in alignment with the rotary shaft of the positioned object, the rotation angle detection means may be a hollow type rotary encoder disposed around the rotary shaft, the hydraulic locking means may be a sleeve disposed between the rotary shaft and an internal surface of a housing, the sleeve may have at its both end portions of its outer circumferential surface a hydraulically tight relation with the internal surface of the housing, and the sleeve may expand radially inward by a hydraulic fluid supplied from an oil passage formed in the housing to enable locking of the rotary shaft.

Moreover, there may be provided a booster which includes, in a tube having internally a large-diameter cylinder chamber and a small-diameter cylinder chamber, a stepped piston having a large-diameter section and a small-diameter section respectively fit in the large-diameter cylinder chamber and the small-diameter cylinder chamber; a primary hydraulic fluid port communicated with the large-diameter cylinder chamber and a secondary hydraulic fluid port communicated with the small-diameter cylinder chamber; and a spring for biasing the stepped piston toward the small-diameter cylinder chamber, and wherein the secondary hydraulic fluid port of the booster is connected to the oil passage to lock the rotary shaft via the sleeve by means of a secondary pressure generated only by the spring.

Furthermore, a portion which is a part of the rotary shaft and receives on its peripheral surface the sleeve is capable of having a diameter greater than the diameter of any of other portions of the rotary shaft.

With the above arrangement, the rotation angle detection means detects the angle of rotation of the rotary shaft of the positioned object, and the rotation angle control means rotates the hydraulic motor by a determined angle via the flow control valve according to a detection result of the rotation angle detection means and a rotation angle instruction, and the hydraulic locking means locks the rotary shaft at a stop position of the rotary shaft.

Therefore, a high-accuracy positioning can be achieved using no positioning coupling. By virtue of using no positioning coupling, the rotary shaft does not move in its axial direction to enable indexing in a short time while preventing the possible generation of noise due to impact at the coupling.

When the rotation angle detection means is constructed of the rotation speed accelerating means connected to the above-mentioned rotary shaft, the accelerated rotary shaft whose rotation speed is accelerated by the speed accelerating means, and the rotary encoder for detecting the angle of rotation of the accelerated rotary shaft; the rotation rotary encoder can have a low resolution as compared with the hollow type rotary encoder disposed around the rotary shaft because the accelerated rotary shaft has a high rotation speed.

When the accumulator is connected to the oil supply line toward the aforementioned flow control valve, since the hydraulic motor is driven by fluid from the oil supply line and fluid from the accumulator, the hydraulic motor can be put into a high-speed rotation condition in a shorter time.

When the output shaft of the hydraulic motor is in alignment with the rotary shaft of the positioned object, by providing the rotation angle detection means by a rotary encoder disposed around the rotary shaft, providing the hydraulic locking means by the sleeve which is disposed between the rotary shaft and the housing and expands radially inward by means of hydraulic fluid to lock the rotary shaft; high-accuracy positioning without backlash can be achieved in a short time while reducing the possible generation of impact and noise in the shaft during the locking time, because the sleeve closely grasps the rotary shaft to lock it. Furthermore, since the hydraulic motor, the sleeve, and the rotary encoder are arranged coaxially with the rotary shaft, the resulting positioning apparatus can be made compact.

By further providing the present positioning apparatus with the booster where the stepped piston having the large-diameter section and the small-diameter section is biased toward the small-diameter section by means of the spring in the tube having primary and secondary ports and connecting the secondary port to the high-pressure oil passage; the rotary shaft can be locked via the sleeve by the secondary pressure generated only by the spring without supplying hydraulic fluid to the booster. The above means that the hydraulic fluid is required to be supplied when rotating the rotary shaft, which enables achieving higher safety. Also, the resulting apparatus is compacted by using the booster.

Furthermore, by making a portion of the rotary shaft for receiving on its peripheral surface the sleeve has a diameter greater than that of any of other portions of the rotary shaft, the sleeve can be made to have an increased contact surface area with respect to the rotary shaft to enable steady locking of the rotary shaft with increased braking force.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 (a) is a schematic diagram of a positioning apparatus where a normal rotary encoder is employed instead of a hollow type rotary encoder of FIG. 1 (a);

FIG. 2 (b) is a side view of the positioning apparatus of FIG. 2 (a);

DETAILED DESCRIPTION OF THE PREFERRED EMBODIMENTS

The following describes positioning apparatuses in accordance with embodiments of the present invention with reference to the attached drawings.

Figure 1A:
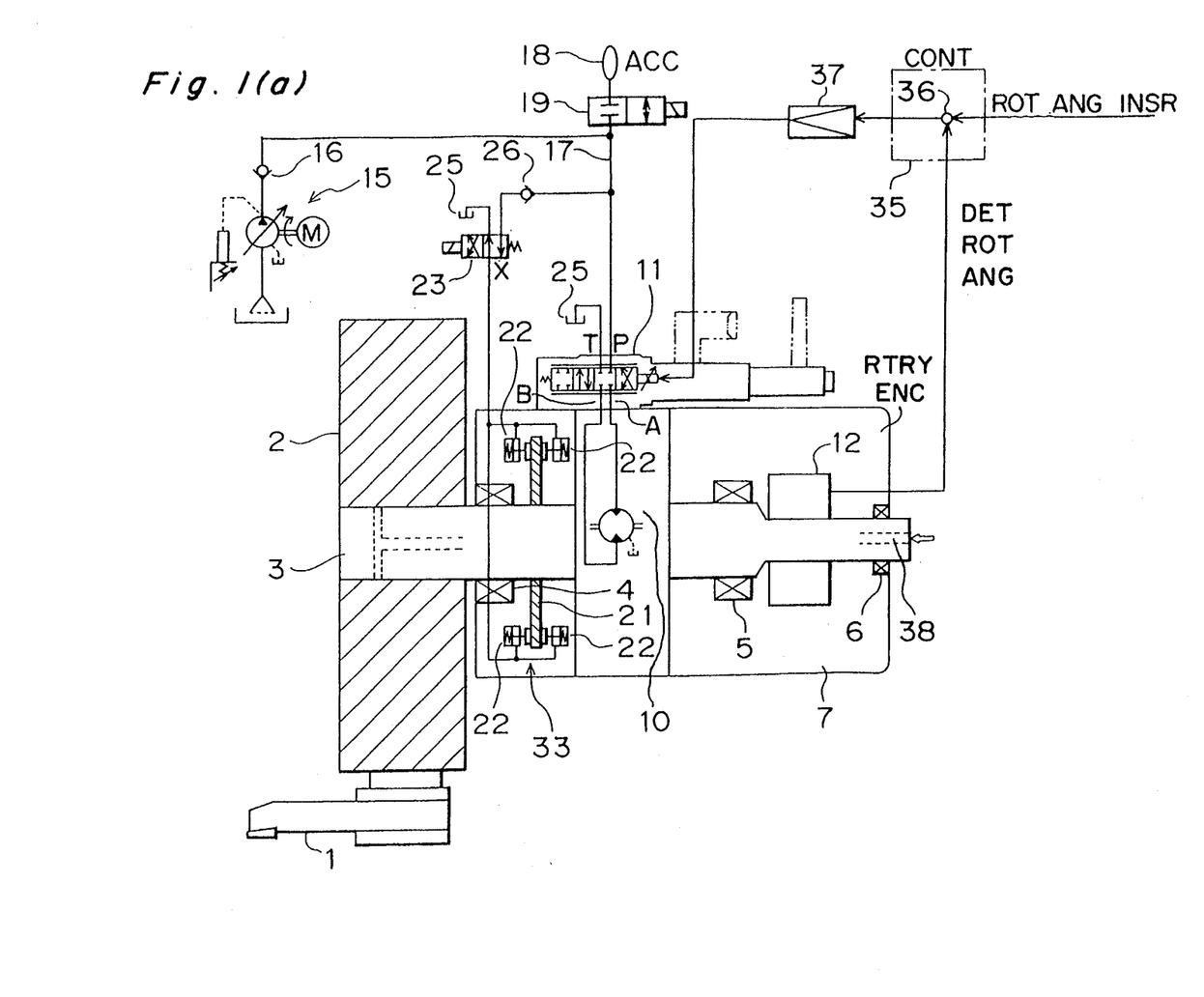
FIG. 1(a) is a schematic diagram of a positioning apparatus with a hydraulic system in accordance with an embodiment of the present invention.
Figure 1B:
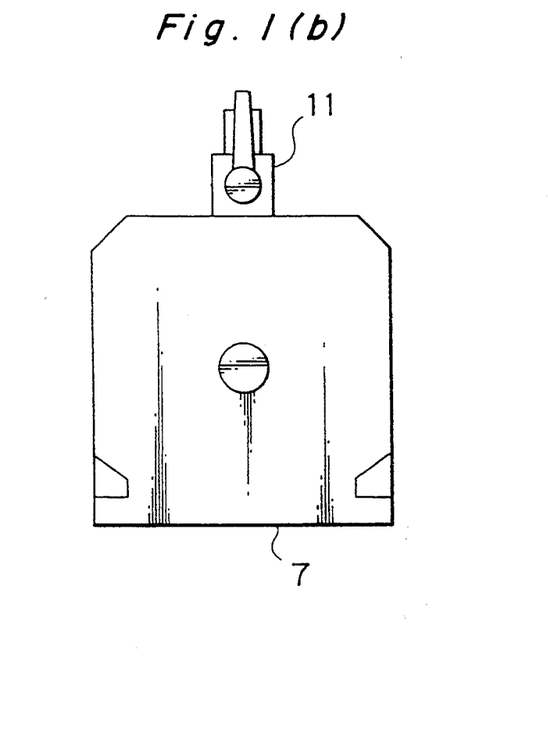
FIG. 1(b) is a side view of the positioning apparatus.

FIG. 1(a) is a schematic diagram of a positioning apparatus with a hydraulic system in accordance with an embodiment of the present invention and FIG. 1(b) is a side view of the apparatus.

Referring to FIG. 1(a), there are provided a blade tool 1, a turret head 2 being a positioned object, a rotary shaft 3 fixed to the turret head 2, bearings 4, 5, and 6 which are fixed to a casing 7 and support the rotary shaft 3, a hydraulic motor 10 for driving the rotary shaft 3, a control valve 11 for switching the passage of oil to the hydraulic motor 10 and controlling the flow rate of oil, and a hollow type rotary encoder 12 put around the rotary shaft 3 for detecting the angle of rotation of the rotary shaft 3.

To the hydraulic motor 10 is supplied oil from a pump unit 15 via a check valve 16 and the control valve 11, as well as from an accumulator 18 connected to an oil supply line 17 to the hydraulic motor 10 via a directional control valve 19. When the control valve 11 is in a condition as shown in FIG. 1 and the directional control valve 19 is turned on, the accumulator 18 is charged by means of fluid from the pump unit 15. When the control valve 11 is switched, the hydraulic motor 10 is activated according to the flow from the pump unit 15 and the flow from the accumulator 18, and therefore the hydraulic motor 10 can be put into a high-speed rotation condition in a short time. Since it is less frequent to index or position the turret head 2 in a numerically controlled lathe and the angle of rotation at a position time takes the least value to an aimed position, the possible maximum angle of rotation is 180° to permit less oil flow rate to the hydraulic motor 10. Therefore, by supplying the quantity of shortage or the whole quantity of oil to the hydraulic motor 10 by means of the accumulator 18, the resulting pump unit 15 can be reduced in size.

Figure 1C:
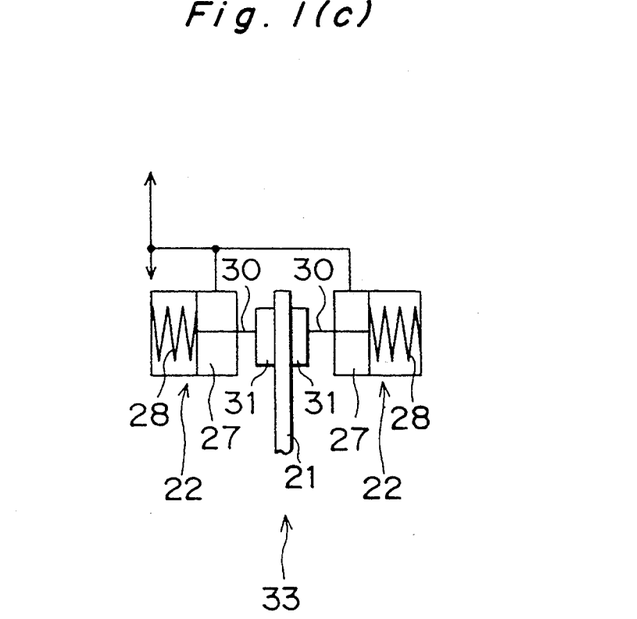
FIG. 1(c) is an enlarged view of an essential portion of a locking mechanism of the positioning apparatus.

The rotary shaft 3 is provided with a disk 21 protruding radially, and when the rotary shaft 3 stops rotating, the disk 21 is pressed by four hydraulic cylinders 22, 22, ... from both surfaces to lock the rotary shaft 3. In more detail, the hydraulic cylinders 22, 22, ... are connected to a tank 25 when a solenoid controlled valve 23 is turned off, and when the solenoid controlled valve 23 is turned on, the hydraulic cylinders 22, 22, ... are connected to the oil supply line 17 via a check valve 26. When the hydraulic cylinders 22 are connected to the tank 25, the internal hydraulic pressures of cylinder chambers 27, 27, ... (see FIG. 1) are released to the tank 25, and pads 31, 31, ... provided at tip portions of rods 30, 30, ... are pressed against the disk 21 by rebound forces exerted from springs 28, 28, ... provided in the hydraulic cylinders 22, 22, ... to lock the rotary shaft 3. When the hydraulic cylinders 22, 22, ... are connected to the oil supply line 17, the springs 28, 28, ... are pressed in directions apart from the disk 21 by hydraulic pressures to unlock the rotary shaft 3. In such a locking mechanism 33, assuming that the force of each spring 28 is $f_1$ and the hydraulic force of each hydraulic cylinder 22 is $f_2$, a value $f_1-f_2$ is made slightly greater than zero. The above means that the pads 31, 31, ... are continuously pressed against the disk 21, and therefore the rotary shaft 3 can be locked and unlocked merely by increasing and decreasing the hydraulic pressure without moving the rods 30, 30, ... of the hydraulic cylinders 22, 22, ..., which also leads to a rapid response to enable reducing the time for positioning. Furthermore, a load torque applied to the rotating rotary shaft 3 can be remarkably reduced.

A detected rotation angle detected by the rotary encoder 12 is input to a controller 35 which serves as a rotation angle control means. The controller 35 has a subtraction circuit 36 to output a signal representing a difference between a rotation angle instruction designated by a main control unit (not shown) and the detected rotation angle to the control valve 11 via an amplifier 37. According to the above-mentioned signal, a position of a spool of the control valve 11 is controlled to rotate the hydraulic motor 10 until the detected rotation angle coincides with the rotation angle instruction, thus positioning the turret head 2. Therefore, a high-accuracy positioning can be achieved using no Curvic (trademark) or positioning coupling, and moreover, the resulting turret head is able to have a simple construction in comparison with an apparatus employing a positioning coupling. Furthermore, there is no need to engage and disengage the positioning coupling, which enables a reduction in the time for positioning.

Furthermore, since the rotary shaft 3 does not move in its axial direction, the rotary shaft 3 is able to have a hole 38 so as to receive therethrough a machining liquid, an electric cable, or a shaft of a machining tool.

Figures 2A, 2B:
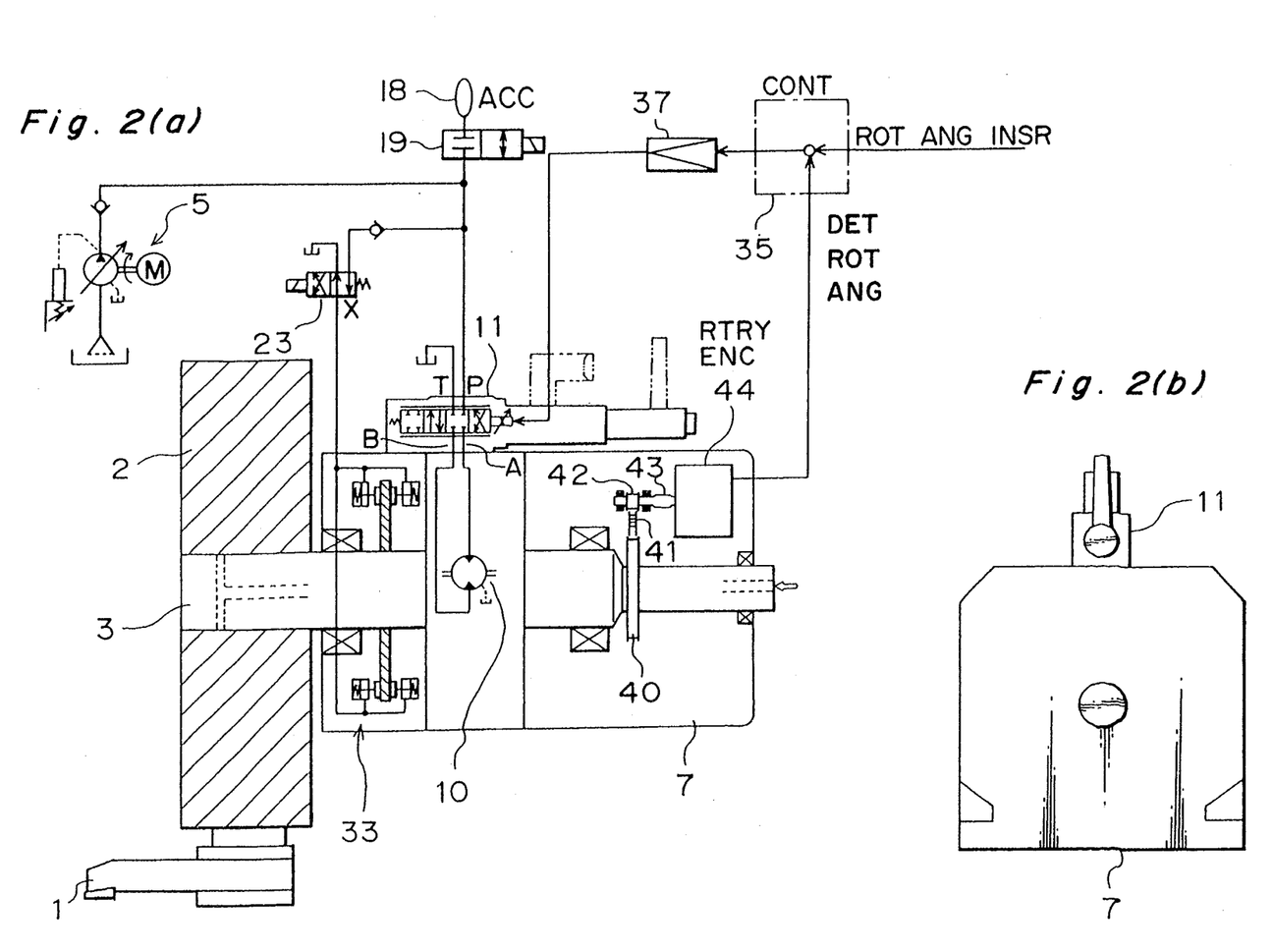

FIG. 2 shows a positioning apparatus in accordance with another embodiment of the present invention which has substantially the same construction as that of the embodiment shown in FIG. 1 except that a small-diameter pulley 42 is driven by a large-diameter pulley 40 put around the rotary shaft 3 by way of a timing belt 41 to detect the angle of rotation of a rotary shaft 43 of the small-diameter pulley 42 by means of an ordinary rotary encoder 44 instead of using the aforementioned hollow rotary encoder 12. As described above, by virtue of the arrangement that the angle of rotation of the rotary shaft 43 having a rotating speed higher than that of the rotary shaft 3 of the turret head 2 is detected instead of directly detecting the angle of rotation of the rotary shaft 3, the same high-accuracy measurement can be performed using a rotary encoder having a low resolution. In other words, use of a rotary encoder having the same resolution can achieve an increased measurement accuracy.

Figure 3:
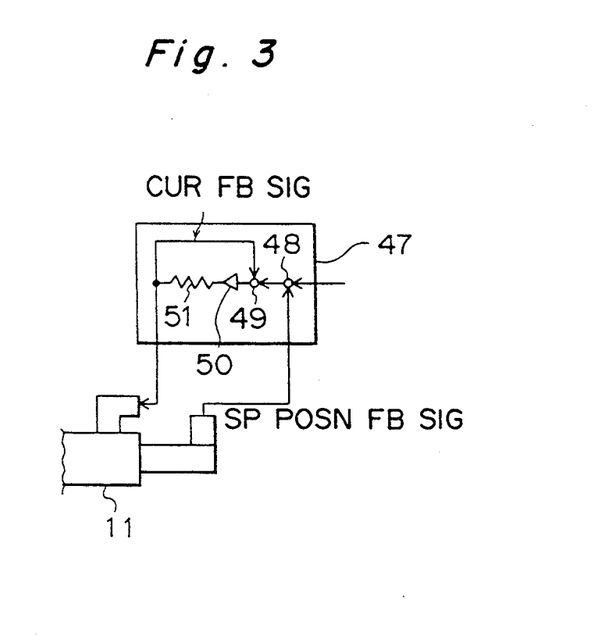
FIG. 3 is a view of a modification of an amplifier of the embodiment shown in FIG. 1.

An amplifier 47 as shown in FIG. 3 may be employed instead of the valve control amplifier 37 shown in FIGS. 1 and 2. The amplifier 47 comprises subtracters 48 and 49, an amplifier circuit 50, and a resistor 51. The amplifier 47 operates to produce a control current to the control valve 11 according to a difference between an output of the controller 35 and a feedback signal representing the position of the spool and to feed back the produced control current to achieve a high-accuracy control.

The locking mechanism 33 shown in FIGS. 1 and 2 may be replaced with any of the locking mechanisms as shown in FIGS. 4 through 7.

Figure 4:
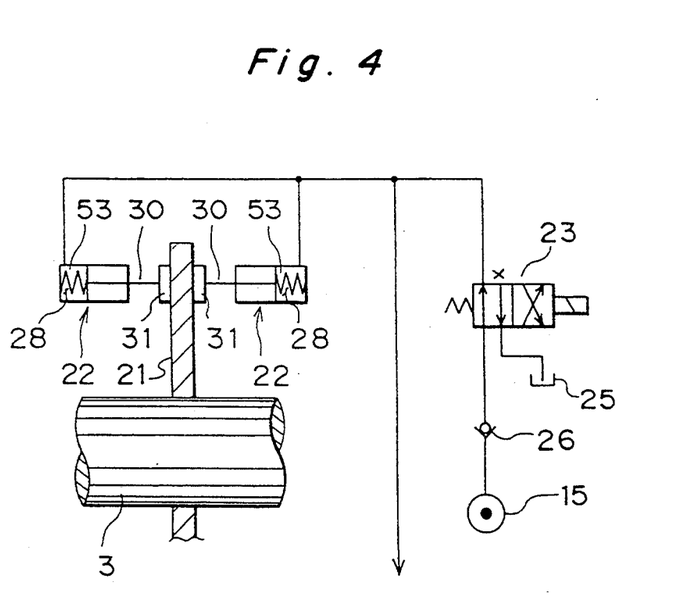
FIG. 4 is a view of a modification of a locking mechanism of the embodiment shown in FIG. 1.

The locking mechanism shown in FIG. 4 has an arrangement that a hydraulic pressure is supplied into a spring chamber 53 of each hydraulic cylinder 22 to lock the rotary shaft 3. In more detail, the rebound force of the spring 28 is set to a small value, and the pads 31 are pressed against the disk 21 only by the rebound force of the spring 28 when the rotary shaft 3 is rotating, and the rotary shaft 3 is locked by means of a hydraulic force of fluid supplied from the pump unit 15 and the above-mentioned rebound force of the spring 28, when the rotary shaft 3 is not rotating. The present locking mechanism has an advantageous feature that the springs 28 are permitted to have a weakened rebound force in comparison with the locking mechanism 33 shown in FIG. 1, and the locking and unlocking operations are performed without moving the rods 30 in the same manner as the locking mechanism 33 shown in FIG. 1 to achieve a rapid response.

Figure 5:
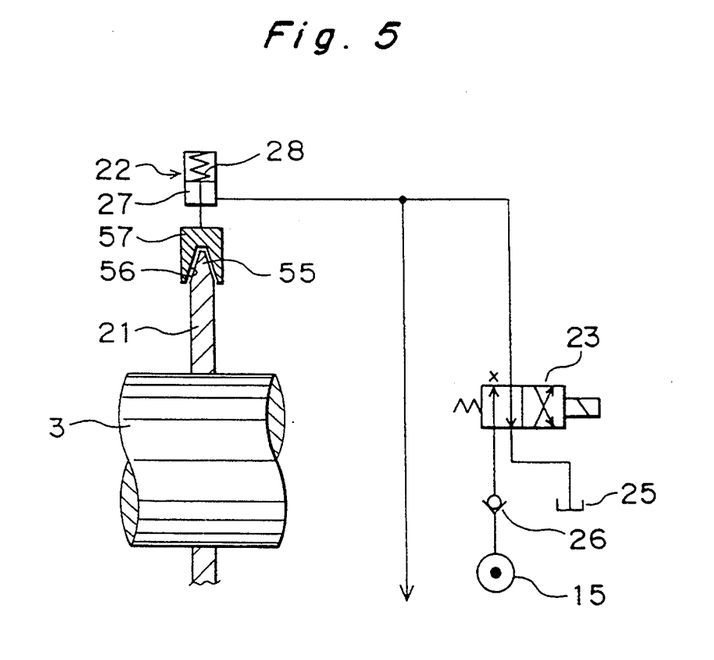
FIG. 5 is a view of a modification of the locking mechanism of the embodiment shown in FIG. 1.

The locking mechanism shown in FIG. 5 has an arrangement that a disk 21 has a wedge-shaped peripheral edge portion 55, and a pad 57 having a groove 56 is pressed against the disk 21 to lock the rotary shaft 3. The present locking mechanism has an advantageous feature that each cylinder chamber 27 is made to communicate with the tank 25 to lock the rotary shaft 3 by means of the spring 28 in the same manner as shown in FIG. 1, and hydraulic fluid is supplied into each cylinder chamber 27 to unlock the rotary shaft 3 with the hydraulic force. Meanwhile, the rebound force of the springs 28 is made slightly greater than the hydraulic force to continuously press the pad 57 against the disk 21 in the same manner as the locking mechanism 33 shown in FIG. 1. However, the present locking mechanism arrangement is able to have an increased locking force in comparison with the locking mechanism 33 shown in FIG. 1 where the disk 21 is pressed from both surfaces.

Figure 6:
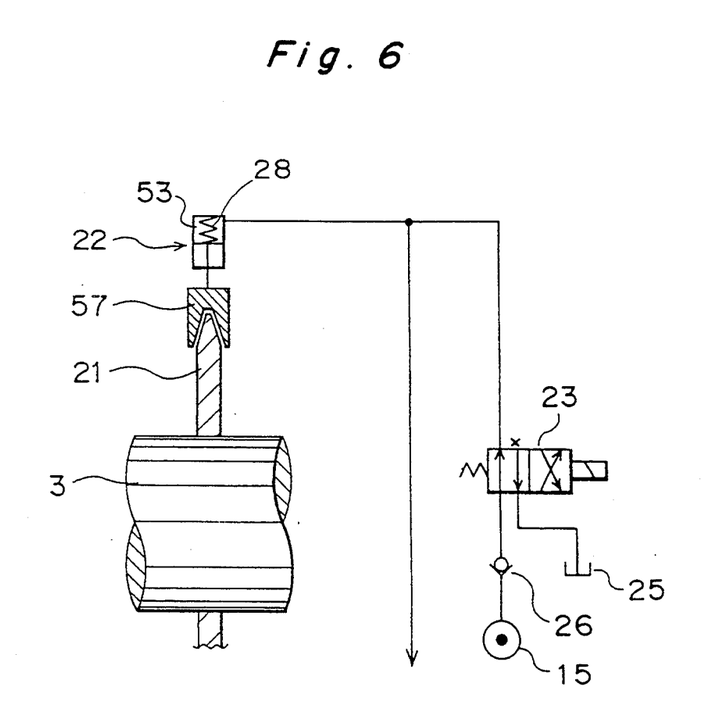
FIG. 6 is a view of a modification of the locking mechanism of the embodiment shown in FIG. 1.

The locking mechanism shown in FIG. 6 has the same disk 21 and pad 57 as those shown in FIG. 5 where hydraulic pressure is supplied to a spring chamber 53 of the hydraulic cylinders 22 in the same manner as shown in FIG. 4. Therefore, the present locking mechanism is able to have an increased locking force in comparison with the locking mechanism shown in FIG. 4 and permit the spring 28 to have a reduced rebound force in comparison with the locking mechanism in FIG. 5.

Figure 7A:
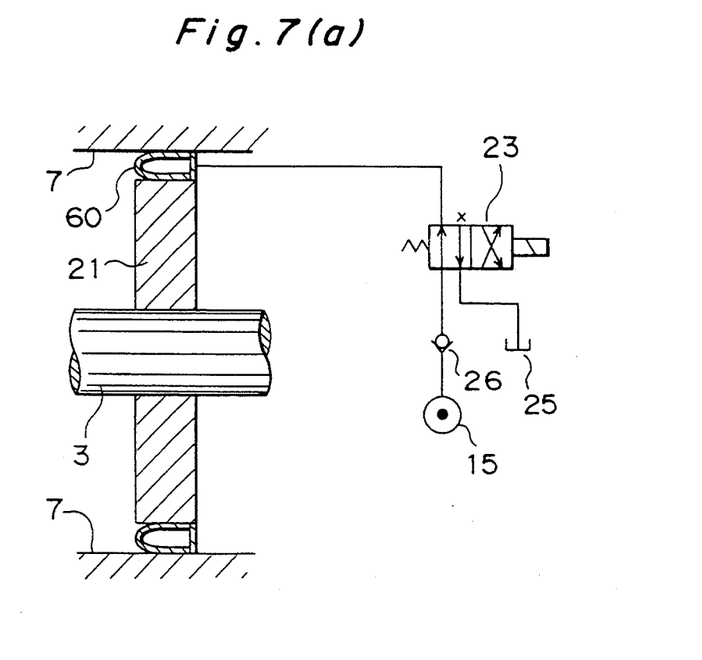
FIG. 7(a) is a view of a modification of the locking mechanism of the embodiment shown in FIG. 1.
Figure 7B:
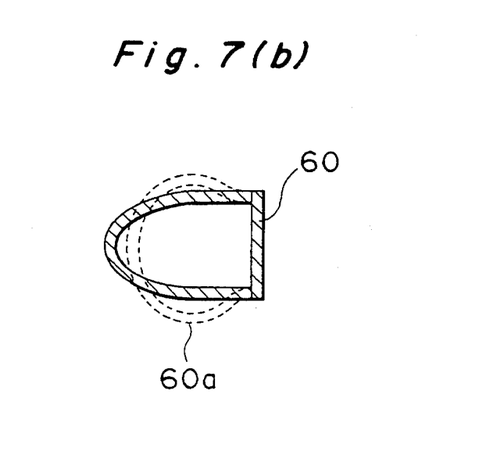
FIG. 7(b) is an enlarged view of an essential portion of FIG. 7(a)

The locking mechanism shown in FIG. 7(a) has an arrangement that an elastic member 60 which elastically deforms by a hydraulic pressure in a manner as indicated by broken lines 60a in FIG. 7(b) is provided between the disk 21 and the casing 7, and the rotary shaft 3 is locked by means of a friction force generated between the elastic member 60 and the disk 21 caused by elastically deforming the elastic member 60. The elastic member 60 can be repetitively used within the elastic strain thereof. The elastic member 60 is positioned in a manner as follows. When the internal pressure of the elastic member 60 is released to the tank 25 by means of the solenoid controlled valve 23, the elastic member 60 is abutted to the disk 21 with such a weak force as to hardly exert torque on the disk 21, or a small clearance is provided between the elastic member 60 and the disk 21 in which condition the rotary shaft 3 is made to rotate for positioning. After completing positioning, the solenoid controlled valve 23 is switched to the pump unit 15 to supply hydraulic fluid into the elastic member 60 to lock the rotary shaft 3. Therefore, the locking and unlocking operation can be performed only by increasing or decreasing the pressure in the same manner as the aforementioned locking mechanism, which enables achieving a reduced time for positioning. The present arrangement has an advantage of achieving a simple construction in comparison with the aforementioned locking mechanisms each composed of the hydraulic cylinders, springs, pads, and other members.

Figure 8:
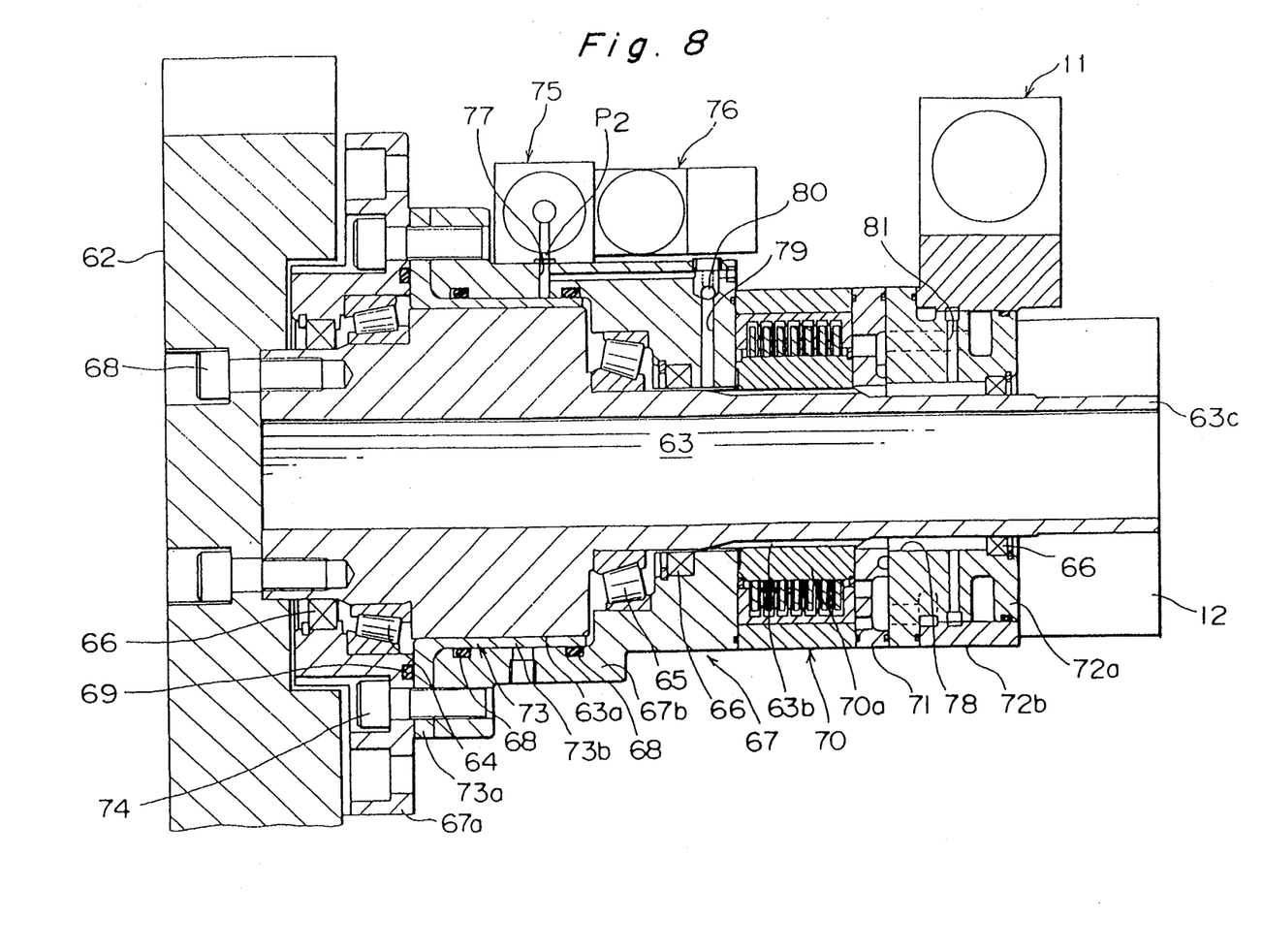
FIG. 8 is a vertical sectional view of a positioning apparatus in accordance with another embodiment of the present invention.

FIG. 8 is a vertical sectional view of a positioning apparatus in accordance with another embodiment of the present invention. The present positioning apparatus has an arrangement that a hollow rotary shaft 63 is fixed centrally to the rear surface of a turret head 62 which serves as an object for positioning by means of a bolt 68 with its forward large-diameter section 63a supported by a housing 67 via bearings 64 and 65, a rotor 70a of a vane motor 70 provided behind the housing 67 is engaged with spline teeth. 63b on the periphery of the hollow rotary shaft 63, and a hollow type rotary encoder 12 provided as a rotation angle detection means is disposed around a hind end portion 63c of the hollow rotary shaft 63 with a port plate 71 and end covers 72a and 72b sandwiched between the vane motor 70 and the rotary encoder 12.

Between a main body 67b of the housing 67 and the large-diameter section 63a of the rotary shaft, a cylindrical sleeve 73 is provided with its collar portion 73a as a hydraulic locking means. The sleeve 73 has a cylindrical portion 73b which is sealed at its both circumferential ends by O-rings 68 disposed at an inner peripheral surface of the main body 67b, while the collar portion 73a is fastened between a mounting flange 67a of the housing 67 provided with an O-ring 69 and the main body 67b by means of a bolt 74.

Thus, the vane motor 70, the rotary encoder 12, and the sleeve 73 are disposed axially in alignment with the hollow rotary shaft 63 of the turret head 62.

In the meantime, on an external surface of the housing 67, a booster 75 and a solenoid controlled valve 76 similar to the solenoid controlled valve 23 of FIG. 1(a) are provided, while on an end cover 72b, the same control valve 11 as the one shown in FIG. 1(a) is provided. A secondary port P$_2$ of the booster 75 and a peripheral side of the cylindrical portion 73b whose both ends are externally sealed by the O-rings 68 are communicated with each other by way of a high-pressure oil passage 77 to squeeze the cylindrical portion 73b radially inward to thereby lock the rotary shaft 3 by the entire surface of the large-diameter section 63a of the rotary shaft 3.

Both a spline engagement portion between the hollow rotary shaft 63 and the rotor 70a of the vane motor 70 and a portion between the hollow rotary shaft 63 and the inner circumferential portions of the port plate 71 and the end cover 72a form a drain oil passage 78 sealed by oil seals 66 provided at both ends of the oil passage 78. The drain oil passage 78 is communicated with a drain port of the vane motor 70, the high-pressure oil passage 77 via a drain oil passage 79 and a check valve 80 in the housing 67, and a tank port of the control valve 11 via a drain oil passage 81 in the end cover 72a. The area between a fore end portion of the rotary shaft 63 and the mounting flange 67a is sealed by the oil seals 66.

Figure 9:
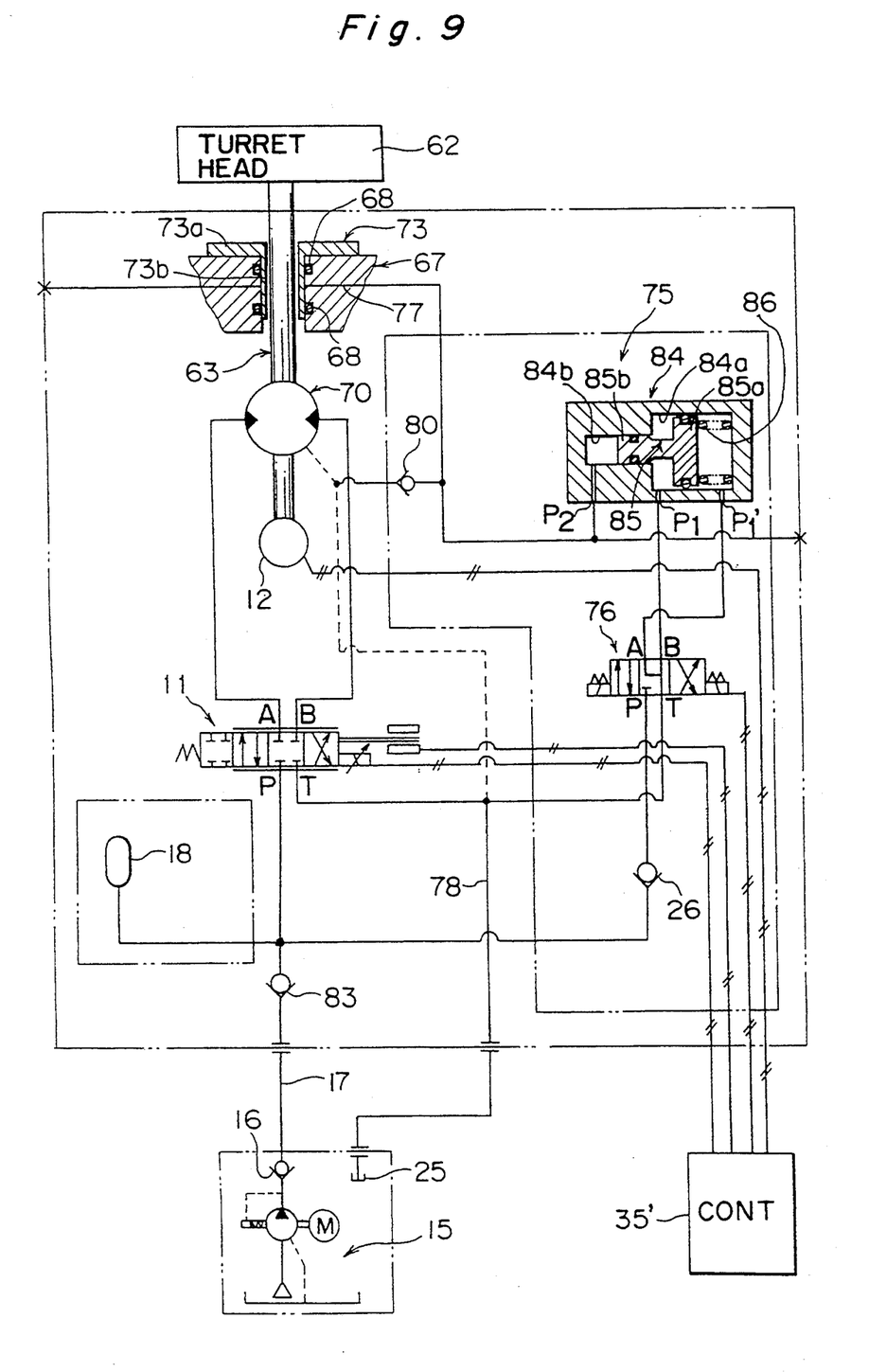
FIG. 9 is a hydraulic circuit diagram of the embodiment shown in FIG. 8.

FIG. 9 shows a hydraulic circuit of the above-mentioned positioning apparatus. The hydraulic circuit has substantially the same construction as the hydraulic circuit shown in FIG. 1(a) except that the solenoid controlled valve 23 of FIG. 1(a) is replaced with an exhaust-center three-position solenoid controlled valve 76, the above-mentioned booster 75 is interposed between the solenoid controlled valve 76 and the sleeve 73 which serves as a hydraulic locking means, and an additional check valve 83 is provided in the oil supply line 17 of the control valve 11. Therefore, like numerals refer to like parts in FIG. 1(a) and FIG. 9, and explanation to like parts is omitted here.

The booster 75 is so arranged that a large-diameter cylinder chamber 84a and a small-diameter cylinder chamber 84b are continuously provided in a tube 84. In the booster 75, a stepped piston 85 is slidably fitted in the tube 84 with its large-diameter section 85a and small-diameter section 85b respectively fit in the large-diameter cylinder chamber 84a and the small-diameter cylinder chamber 84b. Further, primary ports P$_1$ and P$_1'$ opening at both ends of the large-diameter cylinder chamber 84a and a secondary port P$_2$ opening at the fore end portion of the small-diameter cylinder chamber 84b are provided in the tube 84, and the stepped piston 85 is biased toward the small-diameter cylinder chamber 84b by means of a spring 86 compressed in the port P$_1'$ side of the large-diameter cylinder chamber 84a.

The primary ports P$_1$ and P$_1'$ of the booster 75 are connected respectively to load ports A and B of the solenoid controlled valve 76, while the secondary port P$_2$ is connected to the high-pressure oil passage 77 for driving the sleeve 73. In the above-mentioned case, the rebound force of the spring 86 is designed to have such a value that, when the solenoid controlled valve 76 is set at a center position and the primary ports P$_1$ and P$_1'$ are communicated with the tank 25, the hydraulic fluid in the small-diameter cylinder chamber 84b is pressured so that the sleeve 73 expands radially inward by the pressured hydraulic fluid to tightly lock the rotary shaft 63. In other words, the above-mentioned arrangement forms such a negative brake that the rotary shaft 63 is locked when the solenoid controlled valve 76 is off and unlocked when the solenoid controlled valve 76 is on.

On the other hand, a controller 35' provided as a rotation angle control means operates to obtain a deviation between the actually measured angle of rotation of the rotary shaft 63 represented by a detection signal from the rotary encoder 12 and an intended angle of rotation input from by a main control unit (not shown), to control the spool position of the control valve 11 so that the deviation has a value of zero referring to a position detection signal of the spool of the control valve 11 to thereby rotate the vane motor 70, to turn on the solenoid controlled valve 76 when operating the vane motor 70 to switch the solenoid controlled valve 76 into a position as indicated by the right-side symbol in FIG. 9, and to turn off the solenoid controlled valve 76 when the deviation value becomes zero.

The positioning apparatus shown in FIGS. 8 and 9 operate as follows.

When a rotation angle instruction i.e. command signal is input from the main control unit (not shown) to the controller 35' the controller 35' turns on the solenoid controlled valve 76 to switch the valve 76 to the position as indicated by the right-side symbol in FIG. 9. Then the hydraulic fluid discharged from the pump unit 15 is supplied via the oil supply line 17, ports P and B of the directional control valve 76, and the primary ports $P_1$ of the booster 75 to the large-diameter cylinder chamber 84a to slide the stepped piston 85 against the spring 86. Consequently, the hydraulic pressure of fluid in the small-diameter cylinder chamber 84b is reduced. With the reduction of the hydraulic pressure, the sleeve 73 restores to the original state due to transmitting of the hydraulic pressure via the secondary port $P_2$ and the high-pressure oil passage 77 to unlock rotary shaft 63.

Then, upon receiving a detection signal representing a detected rotation angle from the rotary encoder 12, the controller 35' calculates a deviation between the detected rotation angle of the rotary shaft 63 and the intended angle of rotation represented by the rotation angle instruction, and controls the spool position of the control valve 11 so that the deviation has a value of zero referring to a position detection signal of the spool of the control valve 11 to supply the hydraulic fluid discharged from the pump unit 15 to the vane motor 70 to thereby rotate the vane motor 70.

With the above-mentioned operation, the rotary shaft 63 and the turret head 62 rotate into the intended position and stop. Then the controller 35' turns off the solenoid controlled valve 76 to restore the solenoid controlled valve 76 to the neutral position, with which operation the primary ports $P_1$ and $P_1'$ of the booster 75 are communicated with the tank 25. Thus, the hydraulic fluid in the small-diameter cylinder chamber 84b of the booster 75 is pressured again having a high pressure by the stepped piston 85 being biased by the spring 86. Consequently, the sleeve 73 is expanded radially inward by hydraulic fluid introduced via the high-pressure oil passage 77 to be tightly pressed against the rotary shaft 63 to lock the rotary shaft 63. When the solenoid controlled valve 76 is switched to a position as indicated by the left-side symbol in FIG. 9, the hydraulic pressure from the secondary port $P_2$ is further increased to enable locking of the rotary shaft 63 further tightly with the sleeve 73.

Figure 10A:
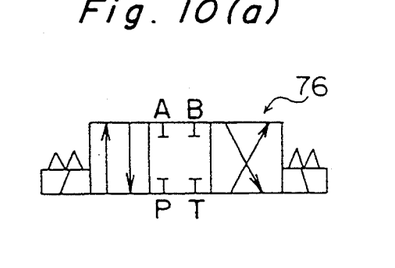
FIGS. 10(a) and (b) are modifications of the solenoid valve of the hydraulic circuit shown in FIG. 9.
Figure 10B:
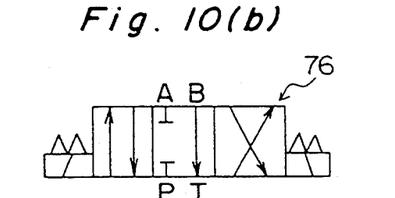

FIGS. 10(a) and (b) show solenoid controlled valves usable in place of the solenoid controlled valve 76 of the positioning apparatus described in conjunction with FIG. 9.

The solenoid controlled valve 76 shown in FIG. 10 (a) is different from the one shown in FIG. 9 in that the solenoid controlled valve 76 is a closed-center type. Therefore, in a positioning apparatus employing the present solenoid controlled valve 76, since the primary ports $P_1$ and $P_1'$ are both closed when the solenoid controlled valve 76 is off, the hydraulic pressure in the secondary port $P_2$ is maintained at a pressure achieved just before turning off the solenoid controlled valve 76 to lock the rotary shaft 63 via the sleeve 73 with the hydraulic pressure.

The solenoid controlled valve 76 shown in FIG. 10(b) is different from the one shown in FIG. 9 in that the path between ports A and P is blocked and ports B and T are communicated with each other in the neutral position of the solenoid controlled valve 76. Therefore, in a positioning apparatus employing the present solenoid controlled valve 76, only the primary port $P_1$ is communicated with the tank 25 when the solenoid controlled valve 76 is off to gradually reduce the hydraulic pressure in the primary port $P_1'$. Consequently, in the neutral position, the rotary shaft 63 is locked in a so-called negative brake manner via the sleeve 73 by the hydraulic pressure generated in the secondary port $P_2$ by the rebound force of the spring 86 in the same manner as the exhaust-center type solenoid controlled valve 76 shown in FIG. 9.

As described above, since the locking operation of the rotary shaft 63 is performed by pressing the sleeve 73 against the entire circumferential surface of the rotary shaft 63 without using a Curvic (trademark) or positional coupling as employed in the conventional apparatus shown in FIG. 11, high-accuracy positioning accompanied by no backlash can be achieved in a short time while reducing impact and noise possibly occurring during the locking time. Furthermore, since the vane motor 70, the sleeve 73, and the rotary encoder 12 are arranged axially in alignment with the rotary shaft 63, the resulting positioning apparatus can be compact.

In addition, by virtue of the negative brake arrangement where the rotary shaft 63 is locked by the booster 75 having the built-in spring 86 when the solenoid controlled valve 76 is off, a constant locking force can be obtained in spite of the possible change of the discharge fluid pressure from the pump unit 15 to thereby assure a high degree of safety. Further, compact designing of the apparatus is achieved with use of the booster 75. In addition, even when the turret head 62 being the object of positioning is overloaded, the rotary shaft 63 slips with respect to the sleeve 73 to prevent possible damage of the entire apparatus.

Since the sleeve 73 is designed to be pressed against the large-diameter section 63a of the rotary shaft 63 in the above-mentioned embodiment, an increased contact surface between the two members can be achieved to lock the rotary shaft 63 further tightly with a strong braking force. Furthermore, since the high-pressure oil passage 77 communicated with the secondary port $P_2$ of the booster 75 is connected to the tank 25 via the check valve 80, a constant pressure is continuously applied to the high-pressure oil passage 77 to prevent the possible occurrence of cavitation, which leads to an advantage of exalting the reliability of the sleeve 73 which serves as a hydraulic locking means and enables rapid locking of the rotary shaft.

As obvious from the above description, the present invention comprises a hydraulic motor for driving a rotary shaft of a positioned object, a flow control valve connected to the hydraulic motor, rotation angle detection means for detecting an angle of rotation of the rotary shaft, rotation angle control means for controlling the flow control valve so as to rotate the hydraulic motor by a prescribed angle according to a detection result of the rotation angle detection means and a rotation angle instruction, and hydraulic locking means for locking the rotary shaft at a stop position of the shaft, the following effects can be produced.

(1) Since the positioning operation is performed by hydraulic locking means based on a detection result of the rotation detection means, high-accuracy positioning can be achieved using no Curvic (trademark) or positioning coupling.

(2) Since no positioning coupling is used, no noise nor vibration caused by engaging teeth of the coupling takes place assuring a simple apparatus construction.

(3) Since the rotary shaft is locked and unlocked by hydraulic locking means, a quicker response and a shorter positioning time can be achieved in comparison with turning on and off the positioning coupling.

(4) Since the rotary shaft does not slide, the shaft is able to have a hollow structure to permit receiving therethrough a machining liquid, an electric cable, or a shaft of a machining tool.

(5) When the rotation angle detection means is constructed of speed accelerating means connected to the above-mentioned rotary shaft, an accelerated rotary shaft whose rotation speed is accelerated by the speed accelerating means, and a rotary encoder for detecting the angle of rotation of the rotary shaft; high-accuracy positioning can be achieved even if the rotary encoder has a low resolution.

(6) When an accumulator is connected to the oil supply line to the aforementioned flow control valve, the resulting hydraulic pump can be small in size.

(7) When the output shaft of the hydraulic motor is axially in alignment with the rotary shaft being the positioned object, the rotation angle detection means is provided by a rotary encoder disposed around the rotary shaft, and the hydraulic locking means is constructed of a sleeve which is disposed between the rotary shaft and the housing and expanded radially inward by means of a hydraulic fluid; high-accuracy positioning accompanied by no backlash can be achieved in a short time while reducing impact and noise possibly occurring during the locking time, and the resulting positioning apparatus can be compact.

(8) When the aforementioned sleeve is driven by the booster which generates a high secondary pressure by means of the spring built in the booster even if no pressured oil is supplied to the primary port, the resulting positioning apparatus can be highly safe and compact.

(9) When a portion of the rotary shaft is made to have a greater diameter to receive the sleeve around the portion, the rotary shaft can be locked further tightly with a strong braking force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A positioning apparatus comprising:
    a hydraulic motor for driving a rotary shaft of a positioned object,
    a flow control valve connected to the hydraulic motor,
    rotation angle detection means for detecting an angle of rotation of the rotary shaft,
    rotation angle control means for controlling the flow control valve to rotate the hydraulic motor by an angle determined based on a detection result of the rotation angle detection means and a rotation angle instruction, and
    hydraulic locking means for directly or indirectly holding the rotary shaft at a periphery thereof to lock the rotary shaft, the hydraulic locking means being a sleeve disposed between the rotary shaft and an internal surface of a housing, the sleeve having outer circumferential surfaces at both end portions with the outer circumferential surfaces being in a hydraulically tight relation with the internal surfaces of the housing, and the sleeve expands radially inward by hydraulic fluid supplied from an oil passage formed in the housing for locking of the rotary shaft.

2. The positioning apparatus as claimed in claim 1, wherein the rotary shaft is a hollow shaft and the rotation angle detection means is a hollow type rotary encoder disposed around the rotary shaft.

3. The positioning apparatus as claimed in claim 1, wherein the rotation angle detection means comprises rotation speed accelerating means connected to the rotary shaft, an accelerated rotary shaft whose rotation speed is accelerated by the rotation speed accelerating means and a rotary encoder for detecting an angle of rotation of the accelerated rotary shaft.

4. A positioning apparatus comprising:
    a hydraulic motor for driving a rotary shaft of a positioned object, the hydraulic motor has an output shaft, the output shaft being disposed in alignment with the rotary shaft of the positioned object,
    a flow control valve connected to the hydraulic motor,
    rotation angle detection means for detecting an angle of rotation of the rotary shaft, the rotation angle detection means being a hollow type rotary encoder disposed around the rotary shaft,
    rotation angle control means for controlling the flow control valve to rotate the hydraulic motor by an angle determined based on a detected result of the rotation angle detection means and a rotation angle instruction, and
    hydraulic locking means for directly or indirectly holding the rotary shaft at a periphery thereof to lock the rotary shaft, the hydraulic locking means being a sleeve disposed between the rotary shaft and an internal surface of a housing, the sleeve having outer circumferential surfaces at both end portions with the outer circumferential surfaces being in a hydraulically tight relation with the internal surface of the housing, and the sleeve expands radially inward by hydraulic fluid supplied from an oil passage formed in the housing for locking of the rotary shaft.

5. The positioning apparatus as claimed in claim 4, further comprising a booster having a tube with an internally large-diameter cylinder chamber and a small-diameter cylinder chamber, a stepped piston having a large-diameter section and a small-diameter section respectively fit in the large-diameter cylinder chamber and the small-diameter cylinder chamber; a primary port communicated with the large-diameter cylinder chamber and a secondary port communicated with the small-diameter cylinder chamber; and a spring for biasing the stepped piston toward the small-diameter cylinder chamber, and wherein the secondary port of the booster is connected to the oil passage to lock the rotary shaft via the sleeve by a secondary pressure generated only by the spring.

6. The positioning apparatus as claimed in claim 4, wherein a portion of the rotary shaft received on a peripheral surface thereof the sleeve having a diameter greater than the diameter of any of other portions and of the rotary shaft.

7. The positioning apparatus as claimed in claim 5, wherein a portion of the rotary shaft receives on a peripheral surface thereof the sleeve having a diameter greater than the diameter of any of other portions of the rotary shaft.

8. The positioning apparatus as claimed in claim 1, wherein the rotary shaft is integrally provided with a disk protruding radially outward and wherein the hydraulic locking means includes hydraulic cylinders pressing both surfaces of the disk to lock the rotary shaft.

* * * * *